(12) United States Patent
Lu et al.

(10) Patent No.: US 11,770,024 B2
(45) Date of Patent: Sep. 26, 2023

(54) MOUSE PAD HAVING MULTI-COIL CAPABLE OF A DYNAMICALLY ADJUSTED CONFIGURATION

(71) Applicant: DEXIN CORPORATION, New Taipei (TW)

(72) Inventors: Ho-Lung Lu, New Taipei (TW); Pai-Yang Chou, New Taipei (TW)

(73) Assignee: DEXIN CORPORATION, New Taipei (TW)

(*) Notice: Subject to any disclaimer, the term of this patent is extended or adjusted under 35 U.S.C. 154(b) by 389 days.

(21) Appl. No.: 17/166,103

(22) Filed: Feb. 3, 2021

(65) Prior Publication Data

US 2022/0103014 A1 Mar. 31, 2022

(30) Foreign Application Priority Data

Sep. 29, 2020 (TW) .................. 109133800

(51) Int. Cl.
*H02J 7/00* (2006.01)
*H02J 50/12* (2016.01)
*H02J 7/02* (2016.01)
*G06F 3/039* (2013.01)
*H02J 50/40* (2016.01)

(52) U.S. Cl.
CPC ............ *H02J 50/12* (2016.02); *G06F 3/0395* (2013.01); *H02J 7/00714* (2020.01); *H02J 7/02* (2013.01); *H02J 50/402* (2020.01)

(58) Field of Classification Search
USPC ................ 320/106, 107, 108, 109, 110, 112
See application file for complete search history.

(56) References Cited

FOREIGN PATENT DOCUMENTS

CN 106464015 A * 2/2017 ............. H02J 50/05
CN 208126350 U * 11/2018

* cited by examiner

*Primary Examiner* — Brian Ngo
(74) *Attorney, Agent, or Firm* — Li & Cai Intellectual Property (USA) Office

(57) ABSTRACT

A mouse pad suitable for operating with a wireless mouse is provided. The mouse pad includes a first charging circuit, a second charging circuit, a control circuit, a power supply module, a conversion circuit and a main body. The first charging circuit, the second charging circuit and the conversion circuit are each electrically connected to the control circuit, and the power supply module is electrically connected to the conversion circuit. The first charging circuit and the second charging circuit each outputs an electromagnetic energy to the wireless mouse. When the control circuit receives a load current flowing through the first charging circuit and the load current flowing through the second charging circuit, through the control circuit, a power supply current of the power supply module to the first charging circuit and to the second charging circuit are dynamically adjusted.

6 Claims, 4 Drawing Sheets

MOUSE PAD HAVING MULTI-COIL CAPABLE OF A DYNAMICALLY ADJUSTED CONFIGURATION

CROSS-REFERENCE TO RELATED PATENT APPLICATION

This application claims the benefit of priority to Taiwan Patent Application No. 109133800, filed on Sep. 29, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse pad, and more particularly to a mouse having a wireless charging function.

BACKGROUND OF THE DISCLOSURE

Conventionally, a wired mouse or a rechargeable mouse pad requires a wire to be connected to a host computer, leading to limited available space. There are currently no commercially available mouse pads with the function of electrical coupling, and also none that can meet the need for a built-in charging cable and the ability to change positions to receive electrical energy.

A large mouse pad may have multiple sets of built-in coils that can be used for charging. However, how to dynamically adjust the configuration of the multiple sets of charging coils has become an urgent issue to be solved in the field of energy conservation.

SUMMARY OF THE DISCLOSURE

In response to the above-referenced technical inadequacies, the present disclosure provides a mouse pad in which a plurality of coils that can be used for charging are built, and the configuration of each coil is dynamically adjusted.

In one aspect, the present disclosure provides a mouse pad suitable for operating with a wireless mouse, and the mouse pad includes a first charging circuit, a second charging circuit, a control circuit, a power supply module, a conversion circuit and a main body.

In certain embodiments, the first charging circuit and the second charging circuit are disposed in the main body. The first charging circuit, the second charging circuit and the conversion circuit are each electrically connected to the control circuit, and the power supply module is electrically connected to the conversion circuit.

In certain embodiments, the first charging circuit and the second charging circuit each outputs an electromagnetic energy to the wireless mouse. When the control circuit receives a load current flowing through the first charging circuit and the load current flowing through the second charging circuit, and when a difference between the load current flowing through the first charging circuit and the load current flowing through the second charging circuit is determined to be greater than a first threshold, through the control circuit, the second charging circuit is not conducted with the power supply module.

In certain embodiments, when the control circuit receives the load current flowing through the first charging circuit and the load current flowing through the second charging circuit, and when a difference between the load current flowing through the first charging circuit and the load current flowing through the second charging circuit is determined to be less than the first threshold, through the control circuit, the first charging circuit is not conducted with the power supply module, so as to dynamically adjust the a power supply current of the power supply module to the first charging circuit and to the second charging circuit.

In another aspect, the present disclosure provides a mouse pad suitable for operating with a wireless mouse, and the mouse pad includes a first charging circuit, a second charging circuit, a third charging circuit, a fourth charging circuit, a control circuit, a power supply module, a conversion circuit and a main body.

In certain embodiments, the first charging circuit, the second charging circuit, the third charging circuit and the fourth charging circuit are disposed in the main body. The first charging circuit, the second charging circuit, the third charging circuit, the fourth charging circuit and the conversion circuit are each electrically connected to the control circuit, and the power supply module is connected to the conversion circuit.

In certain embodiments, the first charging circuit, the second charging circuit, the third charging circuit and the fourth charging circuit each outputs an electromagnetic energy to the wireless mouse. When the control circuit receives a third load current flowing through the first charging circuit, a fourth load current flowing through the second charging circuit, a fifth load current flowing through the third charging circuit and a sixth load current flowing through the fourth charging circuit, respectively, through the control circuit, one of the first charging circuit, the second charging circuit, the third charging circuit and the fourth charging circuit is conducted with the power supply module, and the remaining three of the first charging circuit, the second charging circuit, the third charging circuit and the fourth charging circuit are not conducted with the power supply module.

In yet another aspect, the present disclosure provides a mouse pad suitable for operating with a wireless mouse, and the mouse pad includes a main body, a wireless charging emission circuit, a wireless charging circuit, a control circuit, a power supply module and a conversion circuit.

In certain embodiments, the power supply module is electrically connected to the wireless charging emission circuit to provide a working voltage for the wireless emission circuit. The conversion circuit is electrically connected to both the power supply module and the control circuit.

In certain embodiments, through the control circuit, the wireless charging circuit is not conducted with the conversion circuit. The power supply module, the control circuit, the wireless charging emission circuit and the wireless charging circuit are disposed in the main body. The wireless charging emission circuit is electrically connected to the control circuit and the power supply module, the wireless charging circuit is electrically connected to the control circuit, and the wireless charging emission circuit and the wireless charging circuit form a relatively staggered arrangement.

In certain embodiments, the wireless charging circuit wirelessly receives a first electromagnetic energy provided by the wireless charging emission circuit and converts the first electromagnetic energy into working electrical energy. The wireless charging circuit is activated according to the working electrical energy and wirelessly outputs a second electromagnetic energy to the wireless mouse, so as to generate a corresponding second load current in the wireless charging circuit. The wireless charging emission circuit outputs a third electromagnetic energy to the wireless mouse, so as to generate a first load current in the wireless charging emission circuit. The control circuit controls the wireless charging emission circuit and the wireless charging circuit according to the first load current and the second load current.

In further another aspect, the present disclosure provides a mouse pad suitable for operating with a wireless mouse, and the mouse pad includes a main body, a plurality of wireless charging emission circuits, a plurality of wireless charging circuits, a control circuit and a power supply module.

In certain embodiments, the power supply module is electrically connected to the plurality of wireless charging emission circuits to provide working voltages for the plurality of wireless charging emission circuits.

In certain embodiments, the power supply module, the control circuit, the plurality of wireless charging emission circuits and the plurality of wireless charging circuits are disposed in the main body.

In certain embodiments, any one of the plurality of wireless charging emission circuits is electrically connected to each of the control circuit and the power supply module. Any one of the plurality of wireless charging circuits is electrically connected to the control circuit. The any one of the plurality of wireless charging emission circuits and the any one of the plurality of wireless charging circuits form a relatively staggered arrangement.

In certain embodiments, one of the plurality of wireless charging circuits wirelessly receives a first electromagnetic energy provided by one of the plurality of wireless charging emission circuits and converts the first electromagnetic energy into working electrical energy. The one of the plurality of wireless charging circuits is activated according to the working electrical energy and wirelessly outputs a second electromagnetic energy to the wireless mouse, so as to generate a corresponding second load current in the one of the plurality of wireless charging circuits.

In certain embodiments, the one of the plurality of wireless charging emission circuits outputs a third electromagnetic energy to the wireless mouse, so as to generate a corresponding first load current in the one of the plurality of wireless charging emission circuits.

In certain embodiments, the control circuit controls the plurality of wireless charging emission circuits and the plurality of wireless charging circuits according to the first load current and the second load current.

Therefore, the mouse pad of the present disclosure has multiple built-in charging circuits, in which individual charging circuit has coils that can be used for charging. By dynamically adjusting the power supply current of the power supply module to different charging circuits, energy conservation issues in the charging process of large mouse pads can be improved upon.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
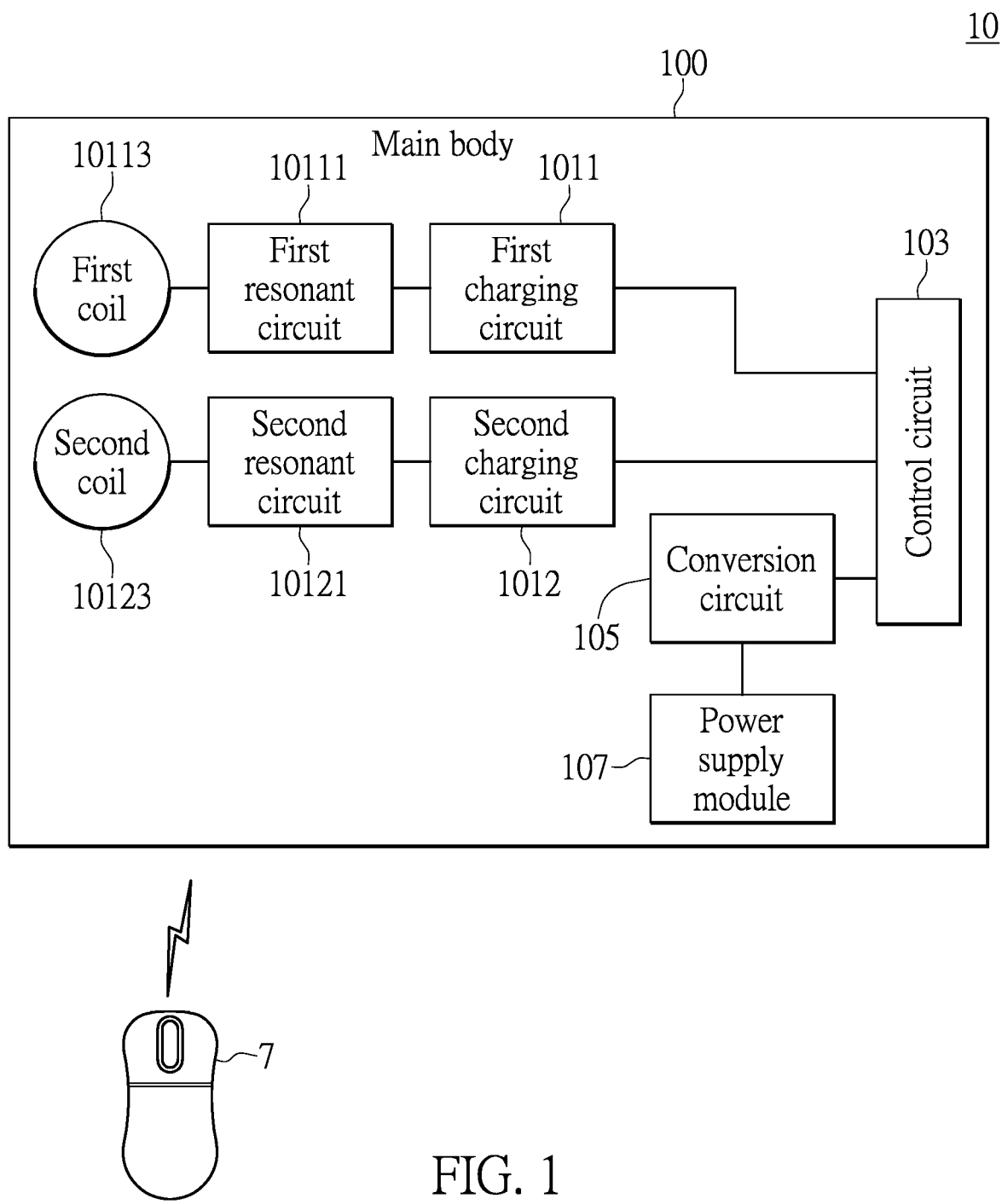
FIG. 1 is a block diagram illustrating a mouse pad having two sets of charging circuits according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which presents a block diagram illustrating a mouse pad having two sets of charging circuits according to an embodiment of the present disclosure. A mouse pad 10 is suitable for operating with a wireless mouse 7. The mouse pad 10 includes a main body 100, a first charging circuit 1011, a second charging circuit 1012, a control circuit 103, a power supply module 107 and a conversion circuit 105.

In one embodiment, the first charging circuit 1011 further includes a first resonant circuit 10111 and a first coil 10113, and the second charging circuit 1012 further includes a second resonant circuit 10121 and a second coil 10123.

The main body 100 can be a one-piece or multi-piece structure, which, for example, can be made of a single base material, or made of a reflective material and an anti-slip material, which is not limited herein. The inside of the main body 100 can be used to accommodate a second charging circuit 1012, a first charging circuit 1011, and the like.

Usually, both the first charging circuit 1011 and the second charging circuit 1012 have a transmitting terminal, a receiving terminal, and a corresponding coil, inductor and capacitor. However, those skilled in the art should understand the transmitting terminal, receiving terminal, and electronic components required for wireless charging, and details thereof are not reiterated herein.

In one embodiment, the first resonant circuit 10111 is electrically connected to the first coil 10113, and the second resonant circuit 10121 is electrically connected to the second coil 10123. The first coil 10113 and the second coil 10123 are both thin coils.

The first resonant circuit 10111 includes, for example, at least a first inductor, a first capacitor and a first resistor. The first inductor, the first capacitor and the first resistor of the first resonant circuit 10111 constitute a first resonance parameter. In the present embodiment, the inductor, the capacitor and the resistor of the first resonant circuit 10111 are connected in series in the circuit diagram. However, in another embodiment, the first resonant circuit 10111 can include different electronic components, and it is not limited in the present disclosure.

Similarly, the second resonant circuit 10121 includes, for example, at least a second inductor, a second capacitor and a second resistor. The second inductor, the second capacitor and the second resistor of the second resonant circuit 10121 constitute a second resonance parameter. The inductor, the capacitor and the resistor of the second resonant circuit 10121 are connected in series in the circuit diagram. However, in another embodiment, the second resonant circuit 10121 can be made of different electronic components, and it is not limited in the present disclosure.

The control circuit 103 is disposed in the main body 100 and is electrically connected to the first charging circuit 1011, the second charging circuit 1012 and the conversion circuit 105. Because the control circuit 103 can have various switches, a power supply current of the power supply module 107 to the first charging circuit 1011 and to the second charging circuit 1012 can be dynamically adjusted.

The conversion circuit 105 is electrically connected to the control circuit 103, and the power supply module 107 is electrically connected to the conversion circuit 105. The conversion circuit 105 provides working electrical energy for the first charging circuit 1011 and for the second charging circuit 1012.

After the power supply module 107 is activated, because the first charging circuit 1011, the control circuit 103 and the power supply module 107 are electrically connected, and the second charging circuit 1012, the control circuit 103 and the power supply module 107 are also electrically connected, the first charging circuit 1011 and the second charging circuit 1012 each can wirelessly output an electromagnetic to the wireless mouse 7.

Therefore, the first charging circuit 1011 and the power supply module 107, or the second charging circuit 1012 and the power supply module 107 are electrically coupled, so that they can, under normal circumstances, be regarded as active wireless charging circuits to actively transmit wireless electrical energy.

However, when the electrical connection between the first charging circuit 1011 and the power supply module 107 or between the second charging circuit 1012 and the power supply module 107 is interrupted, the first charging circuit 1011 and the second charging circuit 1012 need to receive the wireless electrical energy from an active wireless charging circuit to transmit the wireless electrical energy to the wireless mouse 7. At this time, the first charging circuit 1011 and the second charging circuit 1012 are regarded as passive wireless charging circuits.

In one embodiment, the first charging circuit 1011 is used for electrical coupling with the second charging circuit 1012. When the second charging circuit 1012 receives the wireless electrical energy from the first charging circuit 1011, the second charging circuit 1012 may transmit the wireless electrical energy to the wireless mouse 7.

In detail, the second charging circuit 1012 is similar to a relay station for electrical energy transmission, and can transmit the wireless electrical energy to the wireless mouse 7 with matching resonant parameters. The second charging circuit 1012 can receive the wireless electrical energy from the first charging circuit 1011 through the first charging circuit 1011, and can also transmit the wireless electrical energy to the wireless mouse 7.

The first charging circuit 1011 and the second charging circuit 1012 each includes a transmitting terminal and a receiving terminal. In one embodiment, a magnetic field generated by a transmitting terminal coil of the first charging circuit 1011 passes through a receiving terminal coil of the first charging circuit 1011, and the receiving terminal coil of the first charging circuit 1011 generates an electric field. When a load is connected to the receiving terminal coil of the first charging circuit 1011, the first charging circuit 1011 generates a load current. However, in another embodiment, a load can also be connected to the receiving terminal coil of the second charging circuit 1012 to generate the load current. The present disclosure is not limited thereto.

In one embodiment, when the control circuit 103 receives the load current flowing through the first charging circuit 1011 and the load current flowing through the second charging circuit 1012, and a difference between the load current flowing through the first charging circuit 1011 and the load current flowing through the second charging circuit 1012 is determined to be greater than a first threshold, that is, the wireless mouse 7 receives more electromagnetic energy from the first charging circuit 1011, and the wireless mouse 7 receives less electromagnetic energy from the second charging circuit 1012, then, through the control circuit 103, the second charging circuit 1012 is not conducted with the power supply module 107. At this time, the first charging circuit 1011 can be regarded as an active wireless charging circuit, and the second charging circuit 1012 can be regarded as a passive wireless charging circuit, so as to dynamically adjust a power supply current of the power supply module 107 to the first charging circuit 1011 and to the second charging circuit 1012.

In one embodiment, when the control circuit 103 receives the load current flowing through the first charging circuit 1011 and the load current flowing through the second charging circuit 1012, and a difference between the load current flowing through the first charging circuit 1011 and the load current flowing through the second charging circuit 1012 is determined to be less than a first threshold (i.e., the wireless mouse 7 receives less electromagnetic energy from the first charging circuit 1011, and the wireless mouse 7 receives more electromagnetic energy from the second charging circuit 1012), through the control circuit 103, the first charging circuit 1011 is not conducted with the power supply module 107. At this time, the first charging circuit 1011 can be regarded as a passive wireless charging circuit, and the second charging circuit 1012 can be regarded as an active wireless charging circuit, so as to dynamically adjust a power supply current of the power supply module 107 to the first charging circuit 1011 and to the second charging circuit 1012.

In one embodiment, the control circuit 103 further includes an auxiliary circuit (not shown in the figures) for detecting the load current flowing through the first charging circuit 1011 or the second charging circuit 1012.

Figure 2:
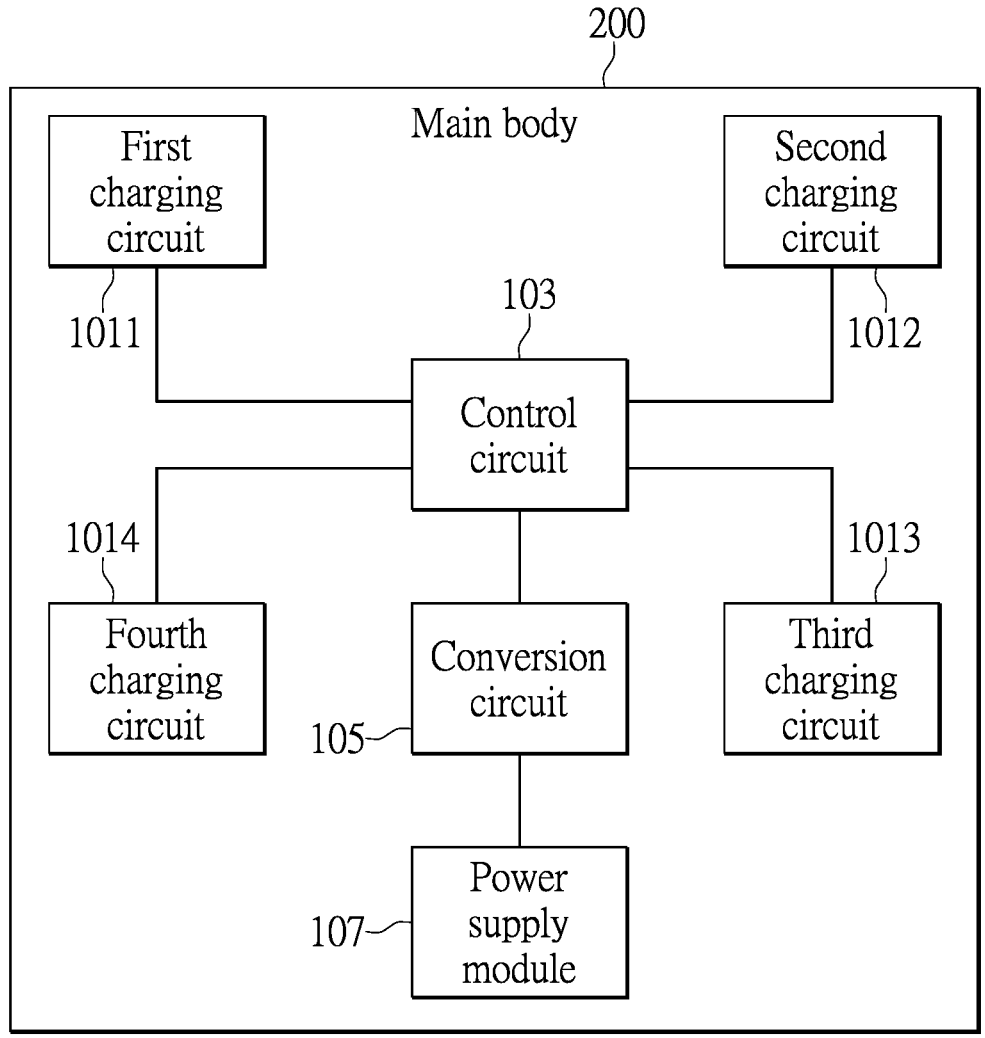
FIG. 2 is a block diagram illustrating a mouse pad having four sets of charging circuits according to an embodiment of the present disclosure.
Figure 2:
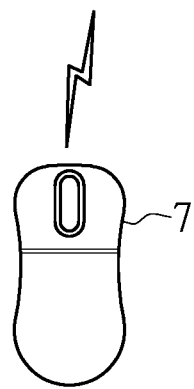

Reference is made to FIG. 1 and FIG. 2, which FIG. 2 is a block diagram illustrating a mouse pad having four sets of charging circuits according to an embodiment of the present disclosure. A mouse pad 20 is suitable for operating with a wireless mouse 7. The mouse pad 20 includes a main body 200, a first charging circuit 1011, a second charging circuit 1012, a third charging circuit 1013, a fourth charging circuit 1014, a control circuit 103, a power supply module 107 and a conversion circuit 105.

In the present embodiment, the first charging circuit 1011, the second charging circuit 1012, the third charging circuit 1013 and the fourth charging circuit 1014 are disposed in the main body 200. The first charging circuit 1011, the second charging circuit 1012, the third charging circuit 1013, the fourth charging circuit 1014 and the conversion circuit 105 are each electrically connected to the control circuit 103, and the power supply module 107 is electrically connected to the conversion circuit 105.

The first charging circuit 1011, the second charging circuit 1012, the third charging circuit 1013 and the fourth charging circuit 1014 each outputs an electromagnetic energy to the wireless mouse 7.

When the control circuit 103 receives a third load current flowing through the first charging circuit 1011, a fourth load current flowing through the second charging circuit 1012, a fifth load current flowing through the third charging circuit 1013 and a sixth load current flowing through the fourth charging circuit 1014, respectively, through the control circuit 103, one of the first charging circuit 1011, the second charging circuit 1012, the third charging circuit 1013 and the fourth charging circuit 1014 is conducted with the power supply module 107, and the remaining three of the first charging circuit 1011, the second charging circuit 1012, the third charging circuit 1013 and the fourth charging circuit 1014 are not conducted with the power supply module 107.

In one embodiment, by the control circuit 103, a relatively largest load current from the third load current, the fourth load current, the fifth load current and the sixth load current is determined according to the relationship between the third load current, the fourth load current, the fifth load current and the sixth load current, so that a member of the combination of the first charging circuit 1011, the second charging circuit 1012, the third charging circuit 1013 and the fourth charging circuit 1014 having the relatively largest load current is conducted with the power module 107, and the remaining three of the charging circuit 1011, the second charging circuit 1012, the third charging circuit 1013 and the fourth charging circuit 1014, that is, members without the relatively largest load current, are not conducted with the power supply module 107.

In this way, one of the combination of the first charging circuit 1011, the second charging circuit 1012, the third charging circuit 1013 and the fourth charging circuit 1014 can be regarded as an active wireless charging circuit, and the remaining three of the combination of the first charging circuit 1011, the second charging circuit 1012, the third charging circuit 1013 and the fourth charging circuit 1014 are regarded as passive wireless charging circuits, so as to dynamically adjust a power supply current of the power supply module 107 to the combination of the first charging circuit 1011, the second charging circuit 1012, the third charging circuit 1013 and the fourth charging circuit 1014.

Figure 3:
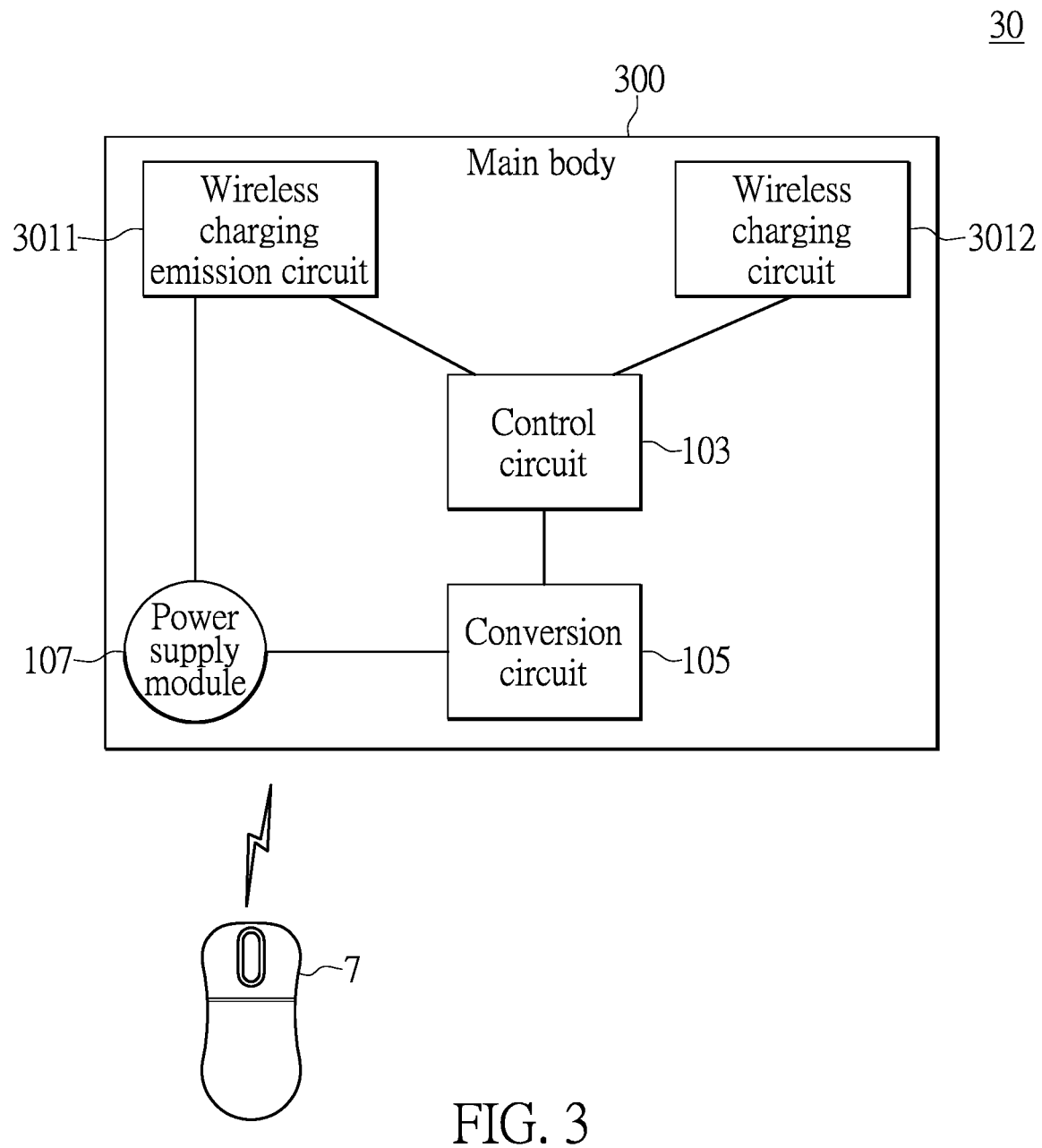
FIG. 3 is a block diagram illustrating a mouse pad having a wireless charging emission circuit and a wireless charging circuit according to an embodiment of the present disclosure.

Reference is to FIG. 3, which presents a block diagram illustrating a mouse pad having a wireless charging emission circuit and a wireless charging circuit according to an embodiment of the present disclosure. A mouse pad 30 is suitable for operating with a wireless mouse 7. The mouse pad 30 includes a main body 300, a wireless charging emission circuit 3011, a wireless charging circuit 3012, a control circuit 103, a power supply module 107 and a conversion circuit 105.

The power supply module 17 is electrically connected to the wireless charging emission circuit 3011 to provide a working voltage for the wireless charging emission circuit 3011.

The conversion circuit 105 is electrically connected to both the power supply module 107 and the control circuit 103, and through the control circuit 103, the wireless charging circuit 3012 is conducted or not conducted with the conversion circuit 105.

The power supply module 107, the control circuit 103, the wireless charging emission circuit 3011 and the wireless charging circuit 3012 are all disposed in the main body 300.

Particularly, the wireless charging emission circuit 3011 is electrically connected to the control circuit 103 and the power supply module 107, the wireless charging circuit 3012 is electrically connected to the control circuit 103, and the wireless charging emission circuit 3011 and the wireless charging circuit 3012 form a relatively staggered arrangement. In the present embodiment, the mouse pad 30 includes only one set of the wireless charging emission circuit 3011 and one set of the wireless charging circuit 3012. However, in another embodiment, the mouse pad can include a plurality of wireless charging emission circuits and a plurality of wireless charging circuits. On a plane, the wireless charging emission circuit and the wireless charging circuit can be arranged in a relatively staggered arrangement to achieve a better power coupling effect.

After the power supply module 107 supplies power, by the control circuit 103, the wireless charging circuit 3012 can be not conducted with the conversion circuit 105. The wireless charging circuit 3012 receives a first electromagnetic energy provided by the wireless charging emission circuit 3011 and converts the first electromagnetic energy into the working electrical energy. The wireless charging circuit 3012 is activated according to the working electrical energy and outputs a second electromagnetic energy to the wireless mouse 7, so as to generate a corresponding second load current in the wireless charging circuit 3012.

The wireless charging emission circuit 3011 outputs a third electromagnetic energy to the wireless mouse 7, so as to generate a corresponding first load current in the wireless charging emission circuit 3011.

The control circuit 103 controls the wireless charging emission circuit 3011 and the wireless charging circuit 3012 according to the first load current and the second load current.

In one embodiment, when the control circuit 103 detects that a ratio of the first load current and the second load current is greater than a second threshold, through the control circuit 103, the wireless charging circuit 3012 is not conducted with the conversion circuit 105. At this time, the wireless charging emission circuit 3011 can be regarded as an active wireless charging circuit, and the wireless charging circuit 3012 can be regarded as a passive wireless charging circuit.

In one embodiment, when the control circuit 103 detects that a ratio of the first load current and the second load current is less than a second threshold, through the control circuit 103, the wireless charging circuit 3012 is conducted with the conversion circuit 105. At this time, both the wireless charging emission circuit 3011 and the wireless charging circuit 3012 are electrically connected to the power supply module 17, and both the wireless charging emission circuit 3011 and the wireless charging circuit 3012 are regarded as active wireless charging circuits.

Figure 4:
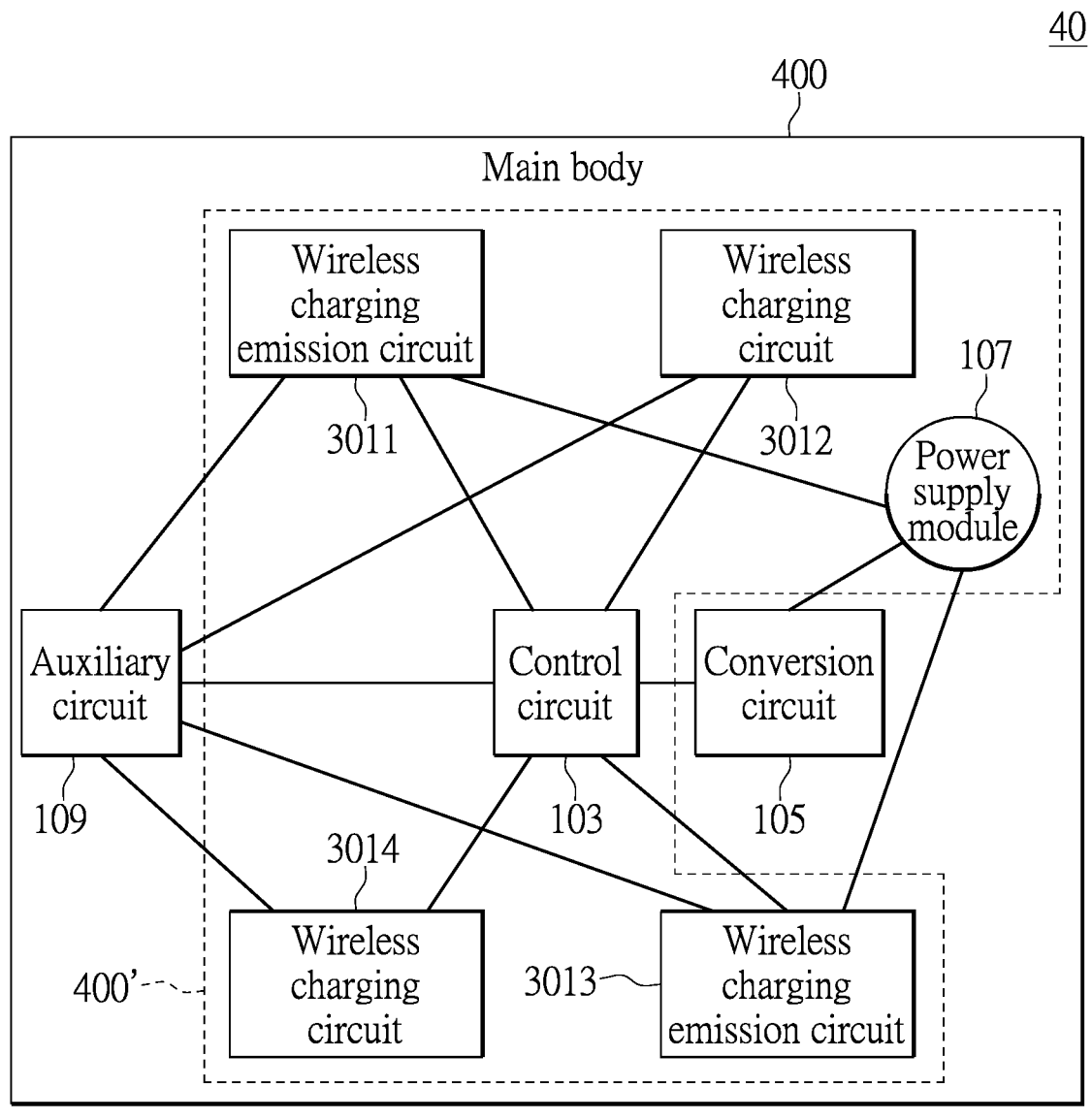
FIG. 4 is a block diagram illustrating a mouse pad capable of dynamically adjusting the configuration of a wireless charging emission circuit and a wireless charging circuit according to an embodiment of the present disclosure.

Reference is made to FIG. 3 and FIG. 4, which FIG. 4 is a block diagram illustrating a mouse pad capable of dynamically adjusting the configuration of a wireless charging emission circuit and a wireless charging circuit according to an embodiment of the present disclosure. A mouse pad 40 is suitable for operating with a wireless mouse 7. The mouse pad 40 includes a main body 400, a plurality of wireless charging emission circuits such as the wireless charging emission circuits 3011 and 3013, a plurality of wireless charging circuits such as the wireless charging circuits 3012 and 3014, a control circuit 103 and a power supply module 107.

The main body includes a smallest main body 400', which is the basic function unit of the present disclosure as shown in FIG. 4.

The power supply module 107 is electrically connected to the wireless charging emission circuits 3011 and 3013 to provide working voltages for the wireless charging emission circuits 3011 and 3013.

The power supply module 107, the control circuit 103, the wireless charging emission circuits 3011 and 3013, and the wireless charging circuits 3012 and 3014 are disposed in the smallest main body 400'.

Particularly, any one of the wireless charging emission circuits 3011 and 3013 is electrically connected to each of the control circuit 103 and the power supply module 107, and any one of the wireless charging circuits 3012 and 3014 is electrically connected to the control circuit 103.

Any one of the wireless charging emission circuits 3011 and 3013 and any one of the wireless charging circuits 3012 and 3014 form a relatively staggered arrangement.

One of the wireless charging circuits 3012 and 3014 wirelessly receives a first electromagnetic energy provided by one of the wireless charging emission circuits 3011 and 3013, and converts the first electromagnetic energy into the working electrical energy.

The one of the wireless charging circuits 3012 and 3014 is activated according to the working electrical energy and outputs a second electromagnetic energy, so as to generate a corresponding second load current in the one of the wireless charging circuits 3012 and 3014.

The one of the wireless charging emission circuits 3011 and 3013 outputs a third electromagnetic energy to the wireless mouse 7, so as to generate a corresponding first load current in the one of the wireless charging emission circuits 3011 and 3013.

Particularly, the control circuit 103 controls the wireless charging emission circuits 3011 and 3013, and the wireless charging circuits 3012 and 3014 according to the first load current and the second load current.

In one embodiment, the mouse pad 40 further includes an auxiliary circuit 109, which is electrically connected to both any one of the wireless charging emission circuits 3011 and 3013, and any one of the wireless charging circuits 3012 and 3014, and the auxiliary circuit 109 is coupled to the control circuit 103.

In one embodiment, the mouse pad 40 further includes a conversion circuit 105 electrically connected to both the power supply module 107 and the control circuit 103.

Particularly, when the auxiliary circuit 109 detects that the load current flowing through one of the wireless charging circuits 3012 and 3014 is greater than a fourth threshold, through the conversion circuit 105, the one of the wireless charging circuits 3012 and 3014 is configured as the wireless charging emission circuit, and through the control circuit 103, the remaining of the wireless charging circuits 3012 and 3014, and any one of the wireless charging emission circuits 3011 and 3013 are not conducted with the conversion circuit 105.

In one embodiment, when the auxiliary circuit 109 detects that the load current flowing through one of the wireless charging emission circuits 3011 and 3013 is greater than a third threshold, through the control circuit 103, the remaining of the wireless charging emission circuits 3011 and 3013, and any one of the wireless charging circuits 3012 and 3014 are not conducted with the conversion circuit 105, so as to dynamically adjust a power supply current of the power supply module 107 to the wireless charging emission circuits 3011 and 3013.

In one embodiment, the control circuit 103 transmits a test current to any one of the wireless charging circuits 3012 and 3014 in a burst mode. When the auxiliary circuit 109 detects that a ratio of the load current flowing through one of the wireless charging circuits 3012 and 3014, and the load current flowing through the remaining of the wireless charging circuits 3012 and 3014 is greater than a fifth threshold, through the conversion circuit 105, the one of the wireless charging circuits 3012 and 3014 is configured as the wireless charging emission circuit, and through the control circuit 103, the remaining of the wireless charging circuits 3012 and 3014, and any one of the wireless charging emission circuits 3011 and 3013 are not conducted with the conversion circuit 105.

In one embodiment, when the auxiliary circuit 109 detects that a difference between the load current flowing through one of the plurality of wireless charging circuits 3012 and 3014 and the load current flowing through another one of the wireless charging circuits 3012 and 3014 is greater than a sixth threshold, the auxiliary circuit 109 transmits a notification signal to the control circuit 103, and by the control circuit 103, the one of the wireless charging circuits 3012 and 3014 is conducted with the conversion circuit 105.

In one embodiment, the wireless mouse 7 is spaced apart from the wireless charging circuit 3012 and the wireless charging circuit 3014 by a length D1 and a length D2, respectively. In an example, when D1 is less than D2, the wireless charging circuit 3012 transmits more wireless electrical energy to the wireless mouse 7 because it is closer to the wireless mouse 7, and the wireless charging circuit 3014 transmits less wireless electrical energy to the wireless mouse 7. The control circuit 103 turns off the wireless charging circuit 3014 according to the amount of the wireless electrical energy transmitted by the coils of the wireless charging circuits 3012 and 3014. In another example, when D2 is less than D1, the wireless charging circuit 3014 transmits more wireless electrical energy to the wireless mouse 7 because it is closer to the wireless mouse 7, and the wireless charging circuit 3012 transmits less wireless electrical energy to the wireless mouse 7. The control circuit 103 turns off the wireless charging circuit 3012 according to the amount of the wireless electrical energy transmitted by the coils of the wireless charging circuits 3012 and 3014.

Beneficial Effects of the Embodiment

In conclusion, the mouse pad of the present disclosure has multiple built-in charging circuits, in which individual charging circuits have coils that can be used for charging. By dynamically adjusting the power supply current of the power supply module to different charging circuits, energy conservation issues in the charging process of large mouse pads can be improved upon.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse pad suitable for operating with a wireless mouse, comprising:
    a main body;
    a plurality of wireless charging emission circuits;
    a plurality of wireless charging circuits;
    a control circuit; and
    a power supply module electrically connected to the wireless charging emission circuit to provide a working voltage for the wireless charging emission circuit;
    wherein the power supply module, the control circuit, the plurality of wireless charging emission circuits and the plurality of wireless charging circuits are disposed in the main body;
    wherein any one of the plurality of wireless charging emission circuits is electrically connected to the control circuit and the power supply module, and any one of the plurality of wireless charging circuits is electrically connected to the control circuit;
    wherein the any one of the plurality of wireless charging emission circuits and the any one of the plurality of wireless charging circuits form a relatively staggered arrangement;
    wherein one of the plurality of wireless charging circuits wirelessly receives a first electromagnetic energy provided by one of the plurality of wireless charging emission circuits and converts the first electromagnetic energy into working electrical energy, and the one of the plurality of wireless charging circuits is activated according to the working electrical energy and wirelessly outputs a second electromagnetic energy to the wireless mouse, so as to generate a corresponding second load current in the one of the plurality of wireless charging circuits;
    wherein the one of the plurality of wireless charging emission circuits outputs a third electromagnetic energy to the wireless mouse, so as to generate a first load current in the one of the plurality of wireless charging emission circuits;
    wherein the control circuit controls the plurality of wireless charging emission circuits and the plurality of wireless charging circuits according to the first load current and the second load current.

2. The mouse pad according to claim 1, further including an auxiliary circuit electrically connected to the any one of the plurality of wireless charging emission circuits and to the any one of the plurality of wireless charging circuits, wherein the auxiliary circuit is coupled to the control circuit.

3. The mouse pad according to claim 2, further including a conversion circuit electrically connected to both the power supply module and the control circuit;
    wherein, when the auxiliary circuit detects that a load current flowing through the one of the plurality of wireless charging circuits is greater than a fourth threshold, through the conversion circuit, the one of the plurality of wireless charging circuits is configured as the first wireless charging emission circuit, and through the control circuit, a remaining of the plurality of wireless charging circuits and the any one of the plurality of wireless charging emission circuits are not conducted with the conversion circuit.

4. The mouse pad according to claim 3, wherein, when the auxiliary circuit detects that the load current flowing through the one of the plurality of wireless charging emission circuits is greater than a third threshold, through the control circuit, a remaining of the plurality of wireless charging emission circuits and the any one of the plurality of wireless charging circuits are not conducted with the conversion circuit, so as to dynamically adjust a power supply current of the power supply module to the plurality of wireless charging emission circuits.

5. The mouse pad according to claim 3, wherein the control circuit transmits a test current to the any one of the plurality of wireless charging circuits in a burst mode, and when the auxiliary circuit detects that a ratio of the load current flowing through the one of the plurality of wireless charging circuits and the remaining of the plurality of wireless charging circuits is greater than a fifth threshold, through the conversion circuit, the one of the plurality of wireless charging circuits is configured as the wireless charging emission circuit, and through the control circuit, the remaining of the plurality of wireless charging circuits and the any one of the plurality of wireless charging emission circuits are not conducted with the conversion circuit.

6. The mouse pad according to claim 3, wherein, when the auxiliary circuit detects that a difference between the load current flowing through the one of the plurality of wireless charging circuits and the load current flowing through another one of the plurality of wireless charging circuits is greater than a sixth threshold, the auxiliary circuit transmits a notification signal to the control circuit, and by the control circuit, the one of the plurality of wireless charging circuits is conducted with the conversion circuit.

* * * * *